(12) United States Patent
Cragun et al.

(10) Patent No.: US 7,925,529 B2
(45) Date of Patent: *Apr. 12, 2011

(54) METHOD AND MEETING SCHEDULER FOR AUTOMATED MEETING SCHEDULING USING DELEGATES, REPRESENTATIVES, QUORUMS AND TEAMS

(75) Inventors: Brian John Cragun, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 657 days.

This patent is subject to a terminal disclaimer.

(21) Appl. No.: 11/874,228

(22) Filed: Oct. 18, 2007

(65) Prior Publication Data

US 2008/0040184 A1 Feb. 14, 2008

Related U.S. Application Data

(63) Continuation of application No. 10/068,033, filed on Feb. 6, 2002, now Pat. No. 7,299,193.

(51) Int. Cl.
*G06Q 10/00* (2006.01)
(52) U.S. Cl. .............................. 705/9; 705/8
(58) Field of Classification Search .................. 705/8, 9
See application file for complete search history.

(56) References Cited

U.S. PATENT DOCUMENTS

| | | | | |
|---|---|---|---|---|
| 5,050,077 A | * | 9/1991 | Vincent | 705/8 |
| 5,093,901 A | * | 3/1992 | Cree et al. | 715/753 |
| 5,774,867 A | * | 6/1998 | Fitzpatrick et al. | 705/8 |
| 5,890,134 A | * | 3/1999 | Fox | 705/9 |
| 5,963,913 A | * | 10/1999 | Henneuse et al. | 705/9 |
| 6,101,480 A | * | 8/2000 | Conmy et al. | 705/9 |
| 6,434,571 B1 | * | 8/2002 | Nolte | 1/1 |
| 2002/0178019 A1 | * | 11/2002 | Anderson et al. | 705/1 |
| 2005/0033615 A1 | * | 2/2005 | Nguyen et al. | 705/5 |

FOREIGN PATENT DOCUMENTS

| | | | |
|---|---|---|---|
| JP | 06028361 A | | 2/1994 |
| JP | 06028361 A | * | 2/1994 |

OTHER PUBLICATIONS

"Automated Meeting Data Structure for Information Interchange in an Office Network" by KJ Scully et al, IBM Technical Data Bulletins, Jan. 1, 1987.*

"Calendar Event Status Association Mechanism" by PA Dugan et al, IBM Technical Data Bulletins, Feb. 1, 1993.*

(Continued)

*Primary Examiner* — Jonathan G Sterrett
(74) *Attorney, Agent, or Firm* — Joan Pennington

(57) ABSTRACT

A method, meeting scheduler and computer program product are provided for automated meeting scheduling using delegates, representatives, quorums, and teams. Meeting settings and invitees data are stored for a meeting. The meeting settings and invitees data includes invitee attendance type, delegates, representatives, quorums, and teams data. A solution time block for automated meeting scheduling including at least a subset of a plurality of selected invitees is identified utilizing the invitee attendance type, delegates, representatives, quorums, and teams data. A selection score is calculated for each potential time block for automated meeting scheduling utilizing the stored meeting settings and invitees data including the invitee attendance type, delegates, representatives, quorums, and teams data. The solution time block for automated meeting scheduling including a subset of a plurality of selected invitees is identified utilizing the calculated selection score.

2 Claims, 17 Drawing Sheets

OTHER PUBLICATIONS

"Method for Automatic Meeting Update upon Requester's Anticipated Change of Expected Attendees" by WJ Johnson, IBM Technical Data Bulletins, Jan. 1, 1994.*
"Manager Delegate Function with RMS" by IBM Technical Data Bulletins, May 1, 2001.*
"Multi-agent based decision mechanism for distributed meeting scheduling system" by Ashir et al, IEEE, 1997.*
"Microsoft Outlook 97 Administrator's Guide", Microsoft Corporation, 1997.*
"Eliciting public values for complex policy decisions" by Keeney et al., Management Science, Sep. 1990.*
"Calendar Event Status Association Mechanism" by PA Dugan et al., IBM Technical Data Bulletins, Feb. 1. 1993.
"iCalendar Transport-Independent Interoperability Protocol (iTIP) Scheduling Events, Busy Time, To-dos and Journal Entries" by S Silverberg et al., The Internet Society, 1998.

* cited by examiner

FIG. 8

| MEETING SETTINGS 800 | | | | | | |
|---|---|---|---|---|---|---|
| TITLE | | | | | | |
| TOPIC | BUDGET | | | | | |
| TIME NEEDED | 60 | MINUTES | ☑ AVOID LUNCH | | | |
| EARLIEST DATE | 10/5/02 | | ☑ AVOID EARLY | | | |
| LATEST DATE | 10/15/02 | | ☑ AVOID LATE | | | |

INVITEES

| NAME | ATTENDANCE | DELEGATE | MIN REPS | MAXIMIZE CONSULT | AUTHORITY |
|---|---|---|---|---|---|
| REVIEW BOARD | QUORUM | NO | 8 | YES | |
| JOHN | ADVISE REQUIRED | YES | | | DECIDE |
| SUE | EXPERT REQUIRED | NO | | REACHABLE | |

[ADD] [REMOVE]

☐ WAIT FOR RESPONSE FROM INVITED PERSONS TO FINALIZE MEETING

FIG. 10

ATTENDEE PROPERTIES 1000

ATTENDANCE
- ◉ REQUIRED
- ○ OPTIONAL

PARTICIPATION
- ○ INDIVIDUAL
- ◉ QUORUM MEMBER
    - MEMBERS COMMITTED [10] [LIST]
    - REQUIRED FOR QUORUM [7]
- ○ TEAM REPRESENTATIVE
    - TEAM MEMBERS AVAILABLE [12] [LIST]
    - REPRESENTATIVES REQUIRED [1]
- ○ DELEGATE FOR [SUSAN A. BOSS]
- ☐ CONSULT
    - ○ STANDBY
    - ○ REACHABLE

COMMITMENT
- ◉ I WILL ATTEND THIS MEETING
    - [CHECK FOR DECOMMIT]
- ○ I CANNOT ATTEND THIS MEETING

CONSULTATION ALLOWED
- STANDBY
    - ○ LOW _____ HIGH
    - ◉ NOT ACCEPTABLE
- REACHABLE
    - ◉ LOW ▽_____ HIGH
    - ○ NOT ACCEPTABLE

FIG. 11

DELEGATE PROFILES 1100

| TOPIC | PERSON | APPROVAL | AUTHORIZATION | CONSULT ME | COST |
|---|---|---|---|---|---|
| BUDGET | PAUL O. KAY | AUTOMATIC | DECIDE | REACHABLE | 0 |
| POLICY | PAUL O. KAY | AUTOMATIC | RECOMMEND | NONE | 0 |
| ANY TOPIC | SHANE P. KATZ | EXPLICIT | RECOMMEND | REACHABLE | 20 |

[MOVE UP]

[MOVE DOWN]

[ADD]

[DELETE]

FIG. 12

```
┌─────────────────────────────────────────────────────────────┐
│                  DELEGATE PROPERTIES 1200                   │
├─────────────────────────────────────────────────────────────┤
```

TOPIC   ⦿   [BUDGET                    ^]    [NEW TOPIC]

○   ANY TOPIC

PERSON   [PAUL O. KAY                      ]

⦿   AUTOMATIC

○   EXPLICIT

AUTHORIZATION   ⦿  MAKE DECISIONS           ☑ CONSULT ME

○  MAKE RECOMMENDATIONS   ☐ CONSULT ME

○  LISTEN AND REPORT

CONSULATATION   ☑ SCHEDULE ME FOR CONSULT

○  STANDBY        ⦿ REACHABLE

ADDITIONAL COST   [20 ^/v]  %

METHOD AND MEETING SCHEDULER FOR AUTOMATED MEETING SCHEDULING USING DELEGATES, REPRESENTATIVES, QUORUMS AND TEAMS

This application is a continuation application of Ser. No. 10/068,033 filed on Feb. 6, 2002, now U.S. Pat. No. 7,299,193.

FIELD OF THE INVENTION

The present invention relates generally to the data processing field, and more particularly, relates to a method, meeting scheduler and computer program product for automated meeting scheduling using delegates, representatives, quorums, and teams.

DESCRIPTION OF THE RELATED ART

Currently available meeting scheduling systems or calendar systems provide tools to find time for a meeting. Simple processing looks at available time and resources, finds the open space that most closely matches the time, then schedules the time and notifies the attendees.

U.S. Pat. No. 5,050,077 discloses a method of scheduling a meeting among terminal users who are provided with calendaring applications for storing and retrieving times and dated events. A prompting screen is presented to a meeting scheduler with blanks for keying in desired times, dates, and prospective attendees for a meeting. In response to the scheduler keying to this screen, a comparison is made with the calendar of events for each prospective attendee. As a result of the nonavailability of a meeting time which complies with the desired times, dates, and attendees, certain of these factors are automatically altered or relaxed in order to achieve an acceptable meeting time. An option list of meeting times is then presented to the scheduler for selection of a meeting time. Based upon the selection of the scheduler, a meeting notification screen is then constructed for transmittal to each attendee.

U.S. Pat. No. 5,093,901 discloses a method of exchanging entries on calendars being maintained by a first and a second calendar user. An event is automatically scheduled on a second calendar if a classification which is associated with the event is higher than any previous scheduled event for the same time slot. A reply is prepared and transmitted to the first calendar user which requested the scheduling of the event regarding the status of the second user in regards to the scheduled event. Subsequently, if the status of the second user changes in regards to the event, a subsequent reply is prepared and transmitted to the first user setting forth the changed status.

U.S. Pat. No. 5,774,867 discloses a method and apparatus for camping on an electronic calendar that in one embodiment determines, in response to an input of a date, a time and a duration of a proposed meeting between meeting requester and a target, that a conflicting event appears on the target's electronic calendar, monitors the target's electronic calendar to detect the removal of the conflicting event, and schedules a meeting between the requester and the target on their electronic calendars in response to the detection of the removal of the conflicting event.

U.S. Pat. No. 5,890,134 discloses a schedule optimizing algorithm scheduling quality, reducing a schedule cycle time and requiring only marginal increase in computer execution time. Lower quality computerized scheduling programs are substantially improved through the additional steps of sequential left time shifting and right time shifting of respective chronologically sorted completion time and starting time task listings.

U.S. Pat. No. 5,963,913 discloses a system and method for scheduling an event subject to the availability of requested participants. A server application receives event information submitted by a scheduler using a client application to access an event definition page. The event information provides one or more options for scheduling an event and lists a plurality of requested participants. Responsive to receiving the event information, the server application creates an event reply page and an event confirmation page. The server application then creates and sends an electronic mail message to each requested participant to provide information about the one or more options and a link to the event reply page. The server application also creates and sends a message to the scheduler to provide a link to the event confirmation page. The server application then receives reply information submitted by the requested participants using client applications to access the event reply page. The server application processes this reply information together with the original event information to generate one or more potential schedules and then updates the event confirmation page based upon the potential schedules. The server application receives an event confirmation submitted by the scheduler using a client application to access the event confirmation page and then creates and sends a message to each available participant to provide the schedule for the event.

U.S. Pat. No. 6,101,480 discloses a system for scheduling time intervals for a plurality of users on a network comprised database system that stores a profile for each potential invitee of the system at one or more servers. The invitee profiles comprises user profiles wherein each user profile has information regarding available and unavailable times for that user. The system further comprises request generators located remotely from the server and connected over a network that generates a request for allocation of a time interval for one or more of the plurality of invitees. A busy time determination device gathers the profiles for the one or more requested invitees that are available in the database and determining whether those invitees are available during the time interval requested by the request generating means. If not all invitees are available, a best fit determinating system determines a next best time interval.

In general, known meeting scheduling systems search for available times of participants. Some systems distinguish between required attendees and optional attendees. Such systems do not consider many additional possibilities when trying to schedule a meeting. For example, such possibilities not considered include when someone can fill in for someone else at a meeting or when only one person of a team needs to be there to represent the team. In some cases enough of the required attendees must be present to be considered a functioning body, this may be a majority or some other fractional number, in committees this is often referred to as a quorum. In still other cases, team support should be scheduled to be available for consultation, even though they may not need to be present at the meeting.

A need exists for an improved electronic calendar meeting scheduling program and method for automated meeting scheduling. It is desirable to provide such an improved electronic calendar meeting scheduling program and method for automated meeting scheduling that uses delegates, representatives, quorums, and teams.

SUMMARY OF THE INVENTION

A principal object of the present invention is to provide a method, meeting scheduler and computer program product for automated meeting scheduling using delegates, representatives, quorums, and teams. Other important objects of the present invention are to provide such a method, meeting scheduler and computer program product for automated meeting scheduling using delegates, representatives, quorums, and teams substantially without negative effect and that overcome many of the disadvantages of prior art arrangements.

In brief, a method, meeting scheduler and computer program product are provided for automated meeting scheduling using delegates, representatives, quorums, and teams. Meeting settings and invitees data are stored for a meeting. The meeting settings and invitees data includes invitee attendance type, delegates, representatives, quorums, and teams data. A solution time block for automated meeting scheduling including at least a subset of a plurality of selected invitees is identified utilizing the invitee attendance type, delegates, representatives, quorums, and teams data.

In accordance with features of the invention, a selection score is calculated for each potential time block for automated meeting scheduling utilizing the stored meeting settings and invitees data including the invitee attendance type, delegates, representatives, quorums, and teams data. The solution time block for automated meeting scheduling including at least a subset of a plurality of selected invitees is identified utilizing the calculated selection score.

BRIEF DESCRIPTION OF THE DRAWINGS

The present invention together with the above and other objects and advantages may best be understood from the following detailed description of the preferred embodiments of the invention illustrated in the drawings, wherein:

FIGS. 8, 9, 10, 11, and 12 are diagrams illustrating exemplary menu user entry screens for receiving user selected data for meeting settings, invitee dialog, meeting attendee properties, meeting delegate profiles and meeting delegate properties for implementing methods for automated meeting scheduling using delegates, representatives, quorums, and teams in accordance with the preferred embodiment.

DETAILED DESCRIPTION OF THE PREFERRED EMBODIMENTS

Figure 1A:
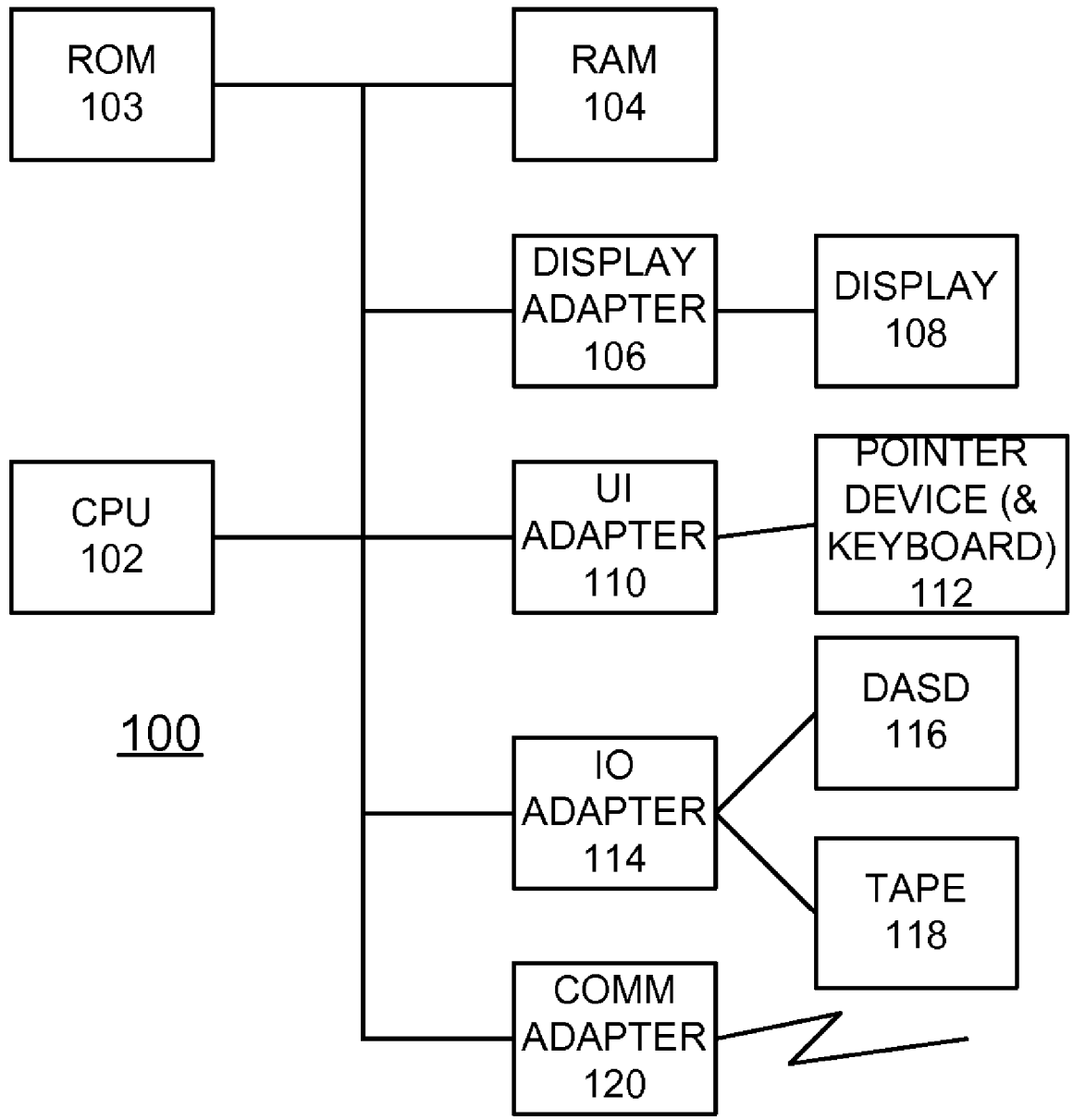
FIGS. 1A and 1B are block diagram representations illustrating a computer system for implementing methods for automated meeting scheduling using delegates, representatives, quorums, and teams in accordance with the preferred embodiment.
Figure 1B:
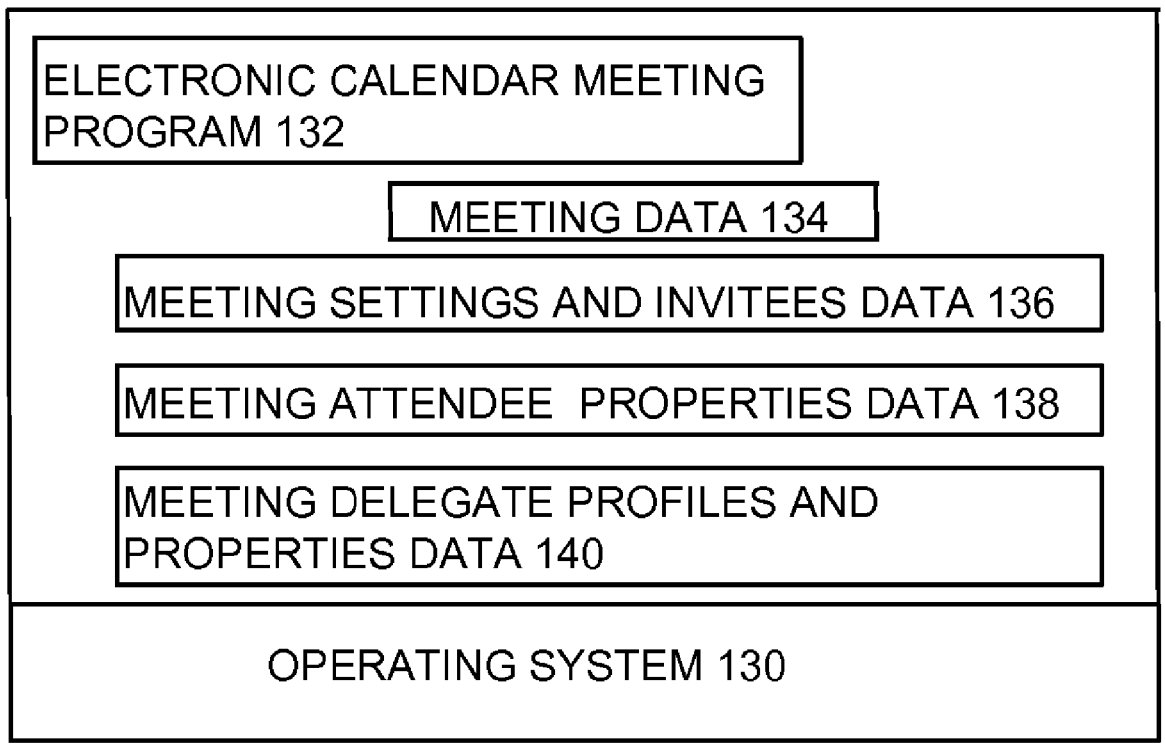

Having reference now to the drawings, in FIGS. 1A and 1B, there is shown a computer or data processing system generally designated by the reference character 100 for carrying out the automated meeting scheduling methods using delegates, representatives, quorums, and teams of the preferred embodiment. As shown in FIG. 1A, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

Figure 9:
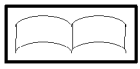

As shown in FIG. 1B, computer system 100 includes an operating system 130 and an electronic calendar meeting-scheduling program 132 of the preferred embodiment. In accordance with features of the preferred embodiment, stored meeting data 134 include meeting setting and invitee data 136, meeting attendee properties data 138, and meeting delegate profiles and meeting delegate properties data 140 of the preferred embodiment. Exemplary meeting setting and invitee data 136 are illustrated in FIGS. 8 and 9. Exemplary meeting attendee properties data 138 are illustrated in FIG. 10. Exemplary meeting delegate profiles and meeting delegate properties data 140 are illustrated in FIGS. 11 and 12.

Various commercially available computers can be used for computer system 100, for example, an IBM personal computer. CPU 102 is suitably programmed by the electronic calendar meeting scheduling program 132 to execute the flowcharts of FIGS. 2, 3A, 3B, 3C, 4, 5A, 5B, 6, and 7 and for generating exemplary menu user entry screens of FIGS. 8, 9, 10, 11, and 12 for receiving user selected data for storing meeting setting and invitee data 136, meeting attendee properties data 138, and meeting delegate profiles and meeting delegate properties data 140 of the preferred embodiment.

In accordance with features of the preferred embodiment, automated meeting scheduling provided by the electronic calendar meeting-scheduling program 132 creates additional categories of attendee groups including delegates, representatives, quorums, and teams to more accurately describe required attendance at a meeting.

In accordance with features of the preferred embodiment, a delegate is a representative who can act in place of another. A group is defined with a primary choice of attendees, and replacement attendees. Each replacement attendee has a score that represents the urgency with which a meeting must happen before the delegate is used instead of the primary choice. If a meeting is scheduled with a delegate, the primary attendee is notified so that they can take alternate action if they are not satisfied with a delegate. In one embodiment, the primary attendee must approve each time a meeting is scheduled where a delegate will represent a required attendee. Different groups can be specified for different topics. A manager can select certain delegates for personnel matter, delegates for a first technical matter and delegates for a second technical matter.

In accordance with features of the preferred embodiment, a representative is similar to a delegate, except there is no primary choice. All members of the representative group have equal priority for selection. Only one available member of the representative group needs to match schedules and only one representative made a required attendee. Other representatives are notified that the meeting is scheduled and someone else is representing the team. The representatives may also carry a number of representative members who must be present, for example, two representative members of a certain team.

In accordance with features of the preferred embodiment, a quorum is an extension of representatives, and carries the number required for quorum. For example, a meeting may require a time slot when 90% of the team members have the time slot open; this is scheduled availability value. An invitation sent to each meeting quorum invitees specifies the number of meeting invitees notified and the number required for the quorum. However, if less than the number required for quorum actually commit to the meeting, or some decommit from the meeting, such that the minimum quorum number are not planning to attend, then the meeting must be moved.

In accordance with features of the preferred embodiment, consultation or team backup options are provided. In addition to notifying other team members who may have delegates or representatives attending meetings for them, there are times when other team members need to be available for consultation. The person does not have to attend the meeting, but they need to be accessible in their office or by phone. For example, the meeting is scheduled together with the person's time for consultation. An invitation sent to each person identified for consultation specifies the purpose of the invitation including a type of consultation. The invitation specifies the number of team member invitees notified and the number of team members required. Consultation team members can work in their office near a phone, or agree to have a cell-phone with them during the scheduled meeting, and may even allow certain kinds of meetings to be interrupted. Thus some meetings may specifically allow sub-scheduling. A person may be on the golf course, but can be scheduled for consultation. Consultation may apply, for example, to an entire team, to one representative, or to a quorum of representatives. An attendee set for consultation is scheduled and is viewed as required for the consultation. For example, even when an attendee is designated as optional, when scheduled for consultation the attendee must be available.

Figure 2:
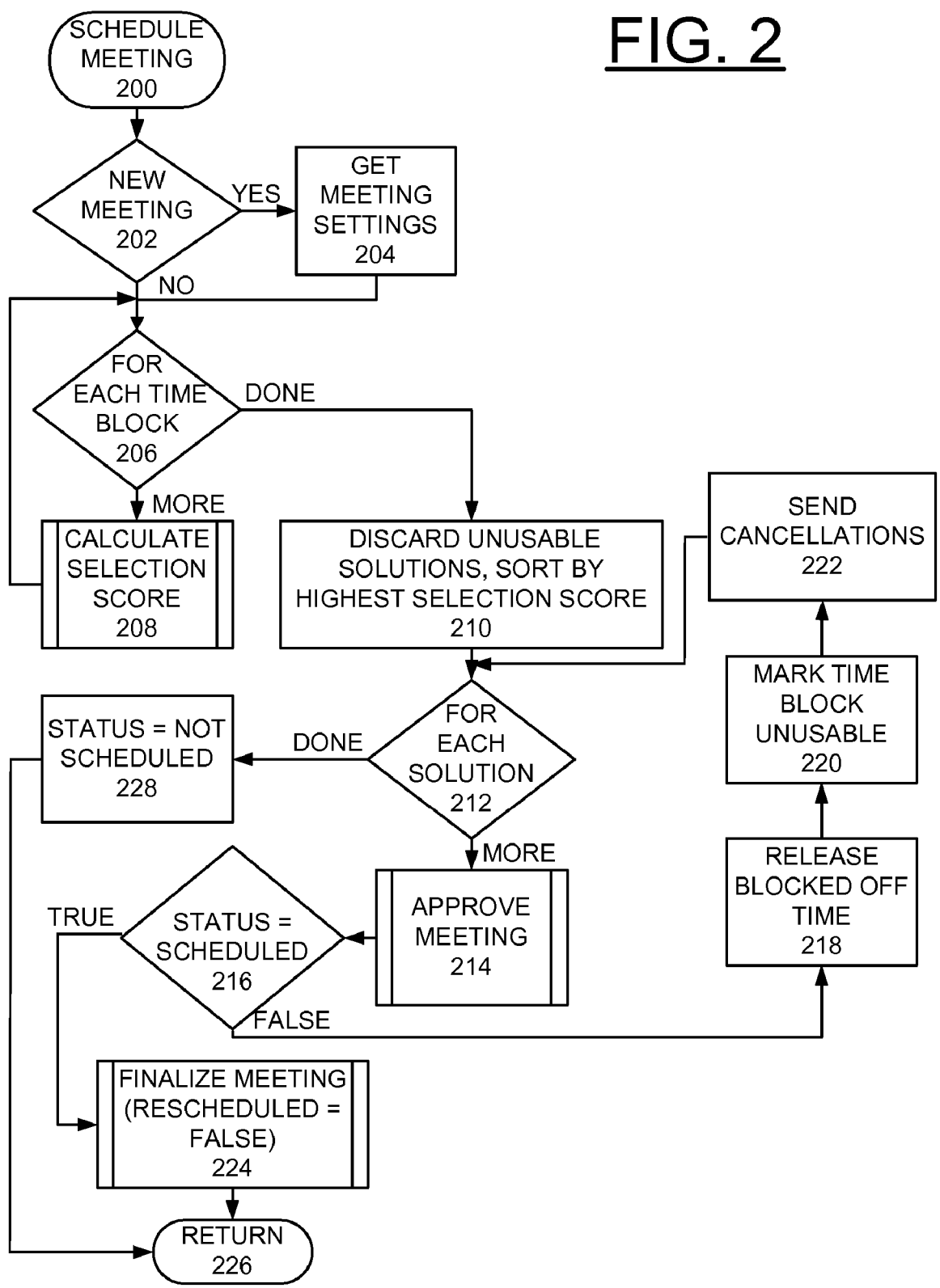
FIGS. 2, 3A, 3B, 3C, 4, 5A, 5B, 6, and 7 flow charts illustrating exemplary steps for automated meeting scheduling using delegates, representatives, quorums, and teams in accordance with the preferred embodiment.

Referring now to FIG. 2, there are shown exemplary steps for automated meeting scheduling methods using delegates, representatives, quorums, and teams in accordance with the preferred embodiment. Meeting scheduling starts as indicated in a block 200. When a new meeting is identified as indicated in a decision block 202, meeting settings data are obtained as indicated in a block 204. Exemplary meeting settings data are illustrated and described with respect to FIG. 8. For each time block as indicated in a decision block 206, a calculate selection score routine is performed as indicated in a block 208. The calculate selection score routine is illustrated and described with respect to FIGS. 3A, 3B, and 3C. Then the unusable solutions are discarded and the calculated selection score results are sorted by highest selection score as indicated in a block 210. Then for each solution as indicated in a decision block 212, an approve meeting routine is performed as indicated in a block 214. The approve meeting routine is illustrated and described with respect to FIG. 4.

While the present invention has been described with the sort by highest selection score used at block 210 where better scores are higher scores, it should be understood that the present invention is not limited to sorting or that higher scores are better scores. It should be understood that the present invention easily can be implemented for example, with a threshold used instead of sorting and also that better scores are lower scores.

After the approve meeting routine is performed, checking whether status equals scheduled is performed as indicated in a decision block 216. When status does not equal scheduled, then the blocked off time is released as indicated in a block 218 and marked as unusable as indicated in a block 220. Cancellations are sent as indicated in a block 222. When status equals scheduled, then a finalize meeting routine is performed and rescheduled is set to false as indicated in a block 224. Then the sequential operations return as indicated in a block 226. The finalize meeting routine is illustrated and described with respect to FIG. 7. Otherwise when each possible solution is unsuccessfully processed, then status is set to not scheduled as indicated in a block 228. Then the sequential steps end at block 226.

Figure 3A:
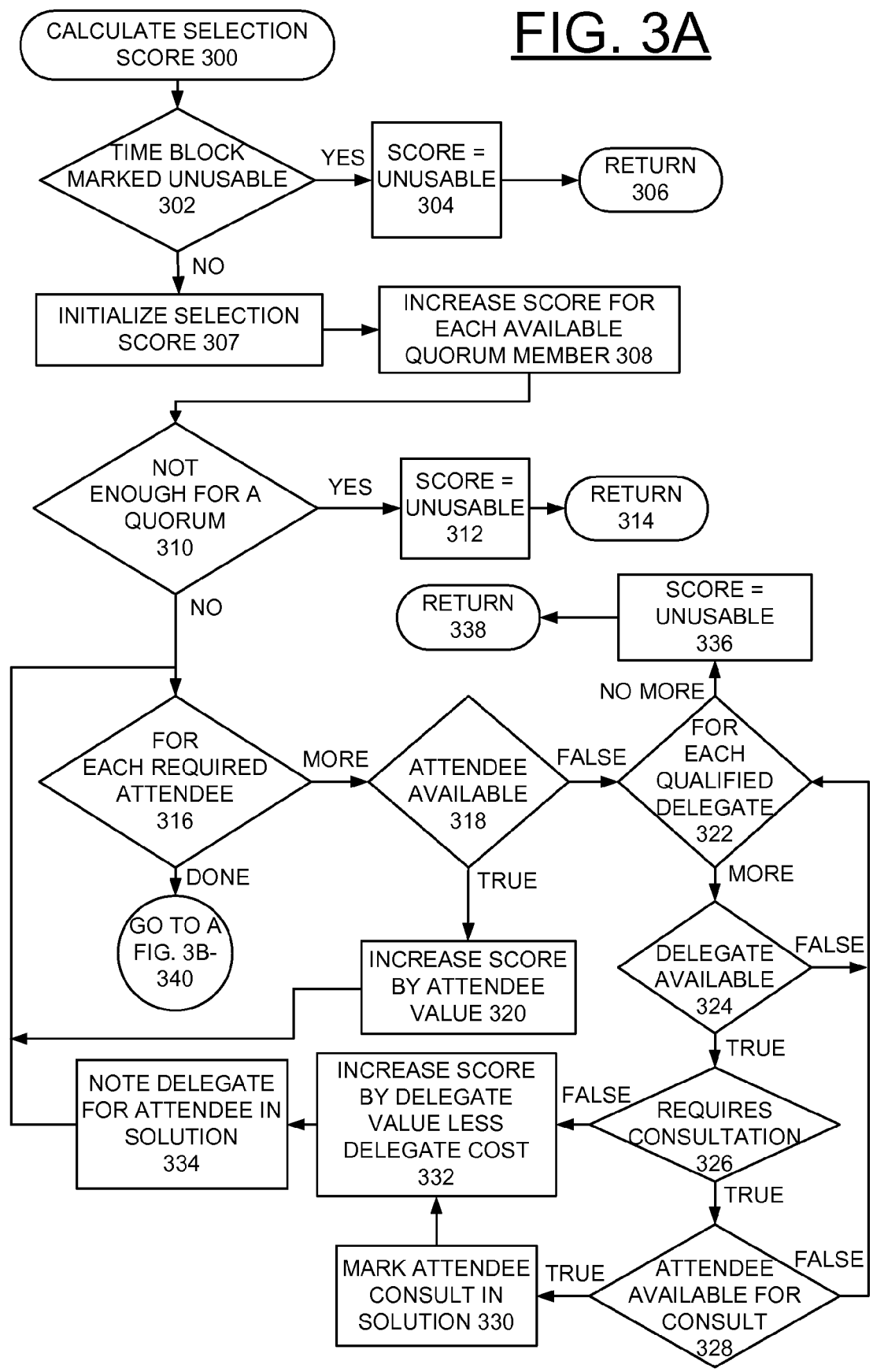
Figure 3B:
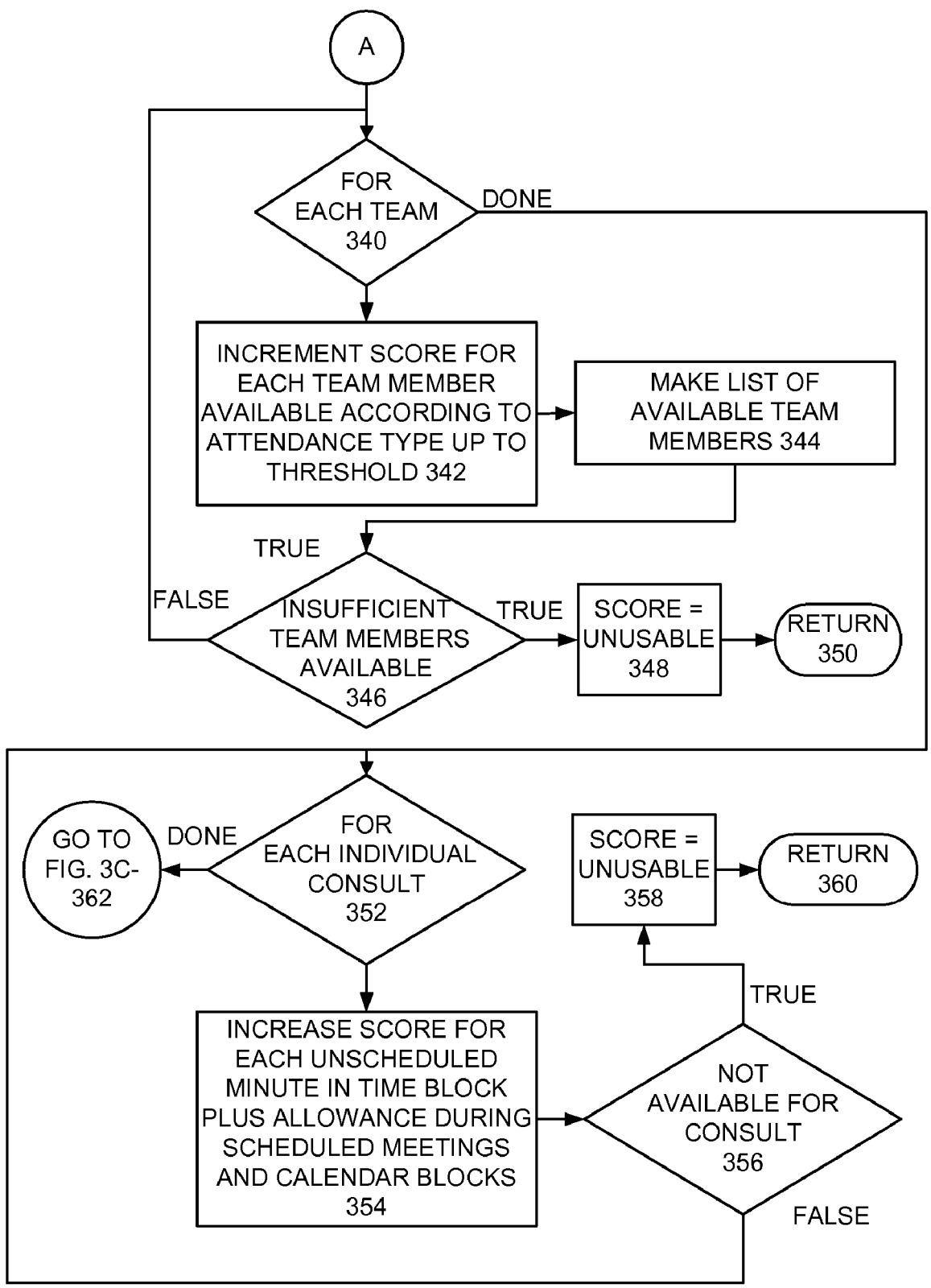
Figure 3C:
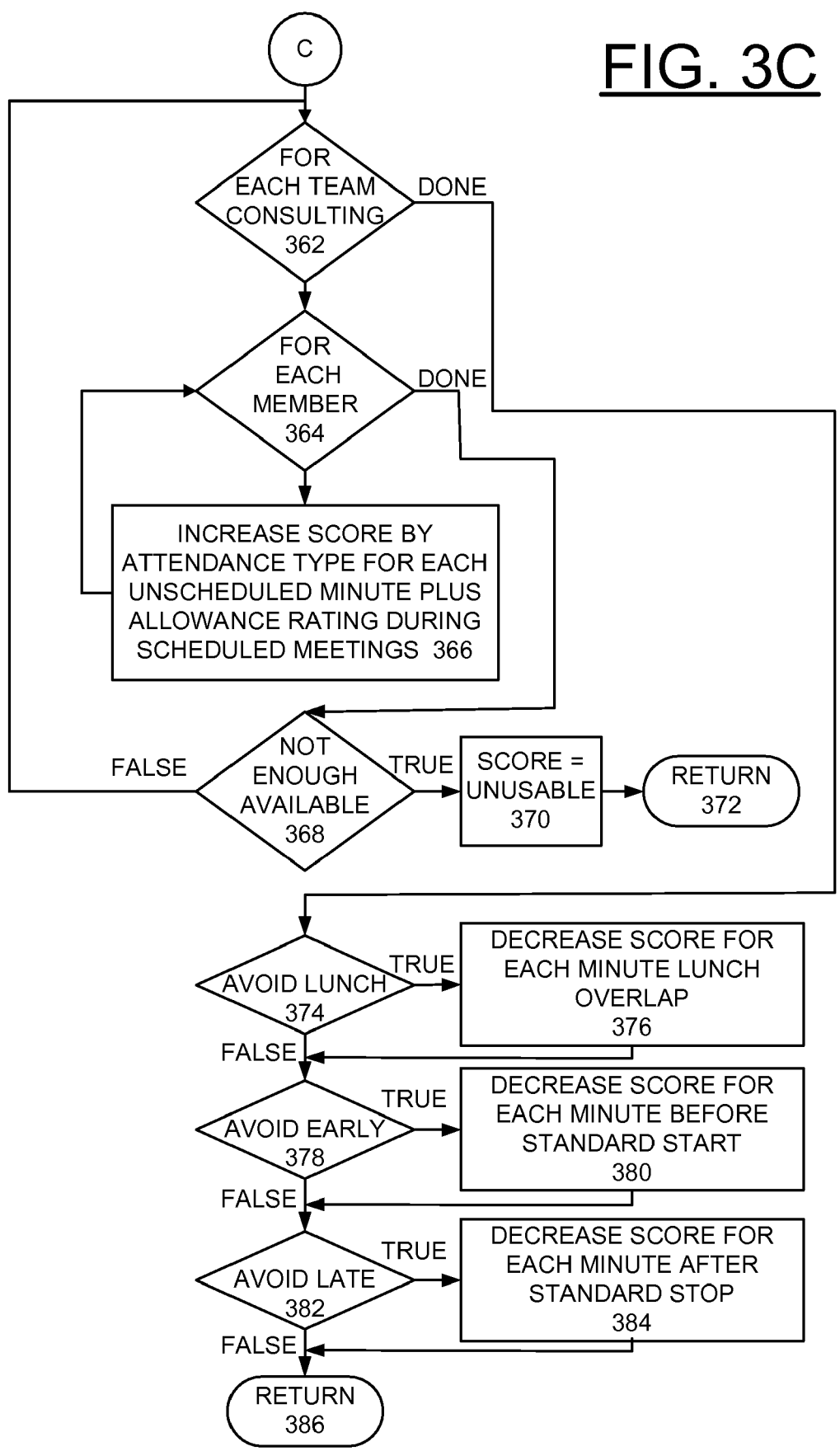

Referring to FIGS. 3A, 3B, and 3C, there are shown exemplary steps for the calculate selection score routine starting at a block 300. Checking whether the time block is marked unusable is performed as indicated in a decision block 302. When the time block is marked unusable, then the selection score is set to unusable as indicated in a block 304. Then the sequential steps return as indicated in a block 306. When the time block is not marked unusable, then the selection score is initialized as indicated in a block 307. The selection score is increased for each available quorum member as indicated in a block 308. Checking whether not enough for a quorum is performed as indicated in a decision block 310. When not enough for a quorum, then the selection score is set to unusable as indicated in a block 312. Then the sequential steps return as indicated in a block 314. When enough for a quorum, then for each required attendee as indicated in a decision block 316 checking whether the attendee is available is performed as indicated in a decision block 318. When the attendee is available, then the selection score is increased by attendee value as indicated in a block 320. The attendee value is an internal constant which provides an increase in the solution score that indicates the worth of having the actual attendee present at the meeting, in contrast to the delegate value, an internal constant not as large as the attendee value, causing a score that is not as high as that when the attendee attends. In other words, the value constants for attendee and delegate yield a score such that delegates attending is good, while attendees attending is better. Then the sequential operations return to decision block 316 to continue with a next required attendee. When the attendee is not available, then for each qualified delegate as indicated in a decision block 322 checking whether the delegate available is performed as indicated in a decision block 324. A qualified delegate is one who is approved for both the topic of the meeting and the authority required. When the delegate is not available, then the sequential operations return to decision block 322 to process another qualified delegate. When the delegate is available, then checking whether the attendee requires consultation from the delegate is performed as indicated in a decision block 326. The attendee specifies in his delegate profile (FIG. 12) whether he should be consulted, and the meeting settings in FIGS. 8 and 9 indicate the required authority of the attendee or his delegate. When consultation from the delegate is required, then checking whether the attendee is available for consult is performed as indicated in a block 328. When the attendee is available for consult, then the attendee to be consulted is noted in the solution as indicated in a block 330. After the attendee to be consulted is marked in the solution or after identifying that consultation is not required, the selection score is increased by the delegate value less a specific delegate cost as indicated in a block 332. A delegate cost as shown in FIGS. 11 and 12 is a defaulted but attendee changeable penalty that is associated with certain delegates that would influence their selection to be less likely. Designated as a loss to whatever delegate value is added in block 332, the delegate cost reduces the worth of a solution involving using that delegate on that topic or authority. It should be understood that the delegate cost could instead be implemented as an added bonus to indicate a preferred outcome without departing from the spirit and scope of the present invention. Then the delegate for attendee is noted in the solution as indicated in a block 334. Then the sequential operations return to decision block 316 to continue with a next required attendee. After each required attendee is identified at decision block 316, then the sequential operations continue following entry A in FIG. 3B. Otherwise when determined that the delegate is not available at decision block 324 or that the attendee is not available for consult at decision block 328 and no more qualified delegates are identified at decision block 322, then the selection score is set to unusable as indicated in a block 336. Then the sequential steps return as indicated in a block 338.

Referring now to FIG. 3B, after each required attendee is identified at decision block 316, then for each team as indicated in a decision block 340 the selection score is incremented for each team member available according to attendance type up to a set threshold as indicated in a block 342. Attendance type for scoring teams places a premium score on quorums, an almost as high score on representatives and a low score on optional. The threshold on team scoring is set to two times a minimum representative's value unless a maximum representative option is selected, as shown in the exemplary meeting settings 800 in FIG. 8. As a result the score increases for each attendee of a team or quorum, only to a maximum threshold. A list is made of available team members as indicated in a block 344. Checking whether insufficient team members are available is performed as indicated in a decision block 346. When insufficient team members are available, then the selection score is set to unusable as indicated in a block 348. Then the sequential steps return as indicated in a block 350. When sufficient team members are available, then the sequential operations return to decision block 340 to continue with a next team. When each team has been identified at decision block 340, then for each individual consult as indicated in a decision block 352, the selection score is increased for each unscheduled minute in the time block plus allowance during scheduled meetings and calendar blocks as indicated in a block 354. Checking whether the individual consult is not available for consult is performed as indicated in a decision block 356. When the individual consult is not available for consult, then the selection score is set to unusable as indicated in a block 358. Then the sequential steps return as indicated in a block 360. When the individual consult is available for consult, then the sequential operations return to decision block 352 to continue with a next individual consult. After each individual consult is identified at decision block 352, then the sequential operations continue following entry C in FIG. 3C.

Referring now to FIG. 3C, for each team consulting as indicated in a decision block 362 and for each member as indicated in a decision block 364 the selection score is increased by attendance type for each unscheduled minute plus each minute during scheduled meetings when the attendee allows interruptions for consulting, modified by the consulting rating scale as indicated in a block 366. In other words, the score is increased for each free minute and to a lesser extent for each minute in a meeting according to the acceptability of interrupting the attendee, at that meeting, as illustrated and described with respect to FIG. 10. Then checking for not enough team members available is performed as indicated in a decision block 368. When not enough team members are available, then the selection score is set to unusable as indicated in a block 370. Then the sequential steps return as indicated in a block 372. When enough team members are available, then the sequential steps return to decision block 362 to continue with the next team consulting. After each team consulting is identified, then checking whether to avoid lunch is performed as indicated in a decision block 374. When true to avoid lunch, then the selection score is decreased for each minute of lunch overlap as indicated in a block 376. Next checking whether to avoid early is performed as indicated in a decision block 378. When true to avoid early, then the selection score is decreased for each minute of before standard start as indicated in a block 380. Next checking whether to avoid late is performed as indicated in a decision block 382. When true to avoid late, then the selection score is decreased for each minute of after standard stop as indicated in a block 384. Thus, with the avoid settings, early, late, and lunch time meetings are allowed, but only when there is no other reasonable time to do so. If a meeting must not occur at an early, late, or lunch hour, the potential attendee must block off their calendar with non-available times. Obviously a repeating meeting to block very early or late hours is trivial and easily made part of an individual's profile. Then the sequential operations return as indicated in a block 386. Similarly, the ability to set blocks of time where nobody is allowed to schedule meetings could obviously be added to an embodiment without departing from the spirit and scope of the present invention.

Figure 4:
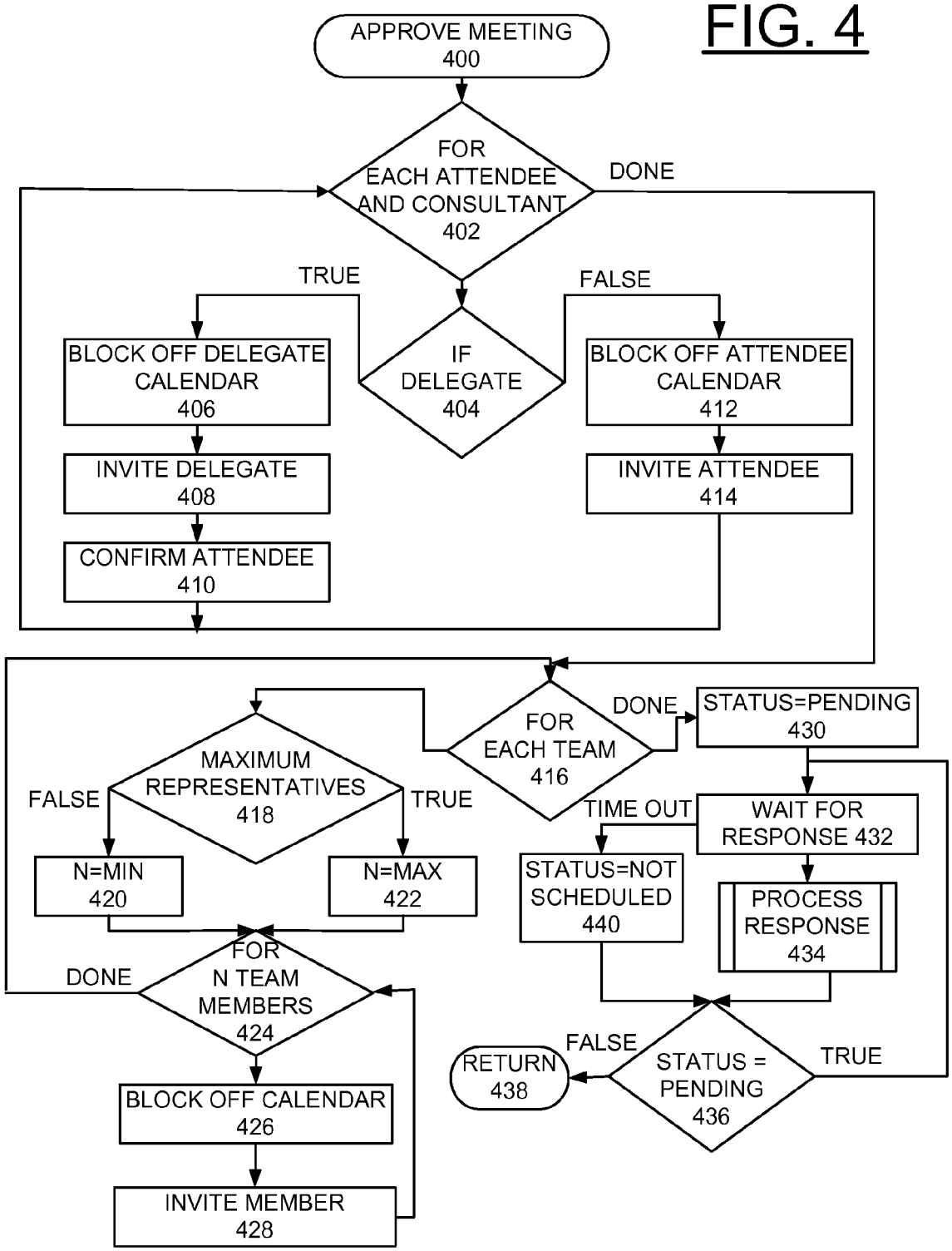

Referring now to FIG. 4, there are shown exemplary steps for the approve meeting routine starting at a block 400. For each attendee and each consultant as indicated in a decision block 402 checking whether a delegate is being used as indicated in a decision block 404. When true, then the delegate calendar is blocked off as indicated in a block 406 and the delegate is invited as indicated in a block 408. In general, all invitations sent requesting confirmation and confirmation responses are processed at block 434. The invitation to the delegate explains that an attendee has delegated to the delegate and requests confirmation. A notice is sent to the attendee stating that a delegate is being sent in the attendee's place and if approval for that delegate is not automatic as specified in the delegate properties of FIG. 12, requests a confirming approval as indicated in a block 410. The request sent to the attendee also provides the optional response that no delegate is approved for this meeting. Otherwise if false or not a delegate, then attendee calendar is blocked off as indicated in a block 412 and the attendee is invited as indicated in a block 414. The invitation to the attendee requests attendee confirmation. Then for each team as indicated in a decision block 416 checking whether to maximize representatives is performed as indicated in a decision block 418. If false or not to maximize representatives, then a variable N is set to a minimum value as indicated in a block 420. If true or to maximize representatives, then the variable N is set to a maximum value as indicated in a block 422. Then for N team members as indicated in a decision block 424, the calendars are blocked off as indicated in a block 426 and the N team members invited as indicated in a block 428. Then the sequential operations return to decision block 416 to continue with a next team. After each team is processed, then status is set to pending as indicated in a block 430. Waiting for a response is provided as indicated in a block 432. A process response routine is performed as indicated in a block 434. The process response routine is illustrated and described with respect to FIGS. 5A and 5B. Then checking whether status equals pending is performed as indicated in a decision block 436. When true or status equals pending, then the sequential operations return to block 432 to wait for a response and continue. Otherwise when false or status does not equal pending, then the sequential operations return as indicated in a block 438. A time out is provided from loop at block 432, in the case that not all responses are received in a timely fashion; in this event, control continues to a block 440 where status is set to not scheduled, after which control flows to block 436 where the test will fail and processing will return as indicated in a block 438.

Figure 5A:
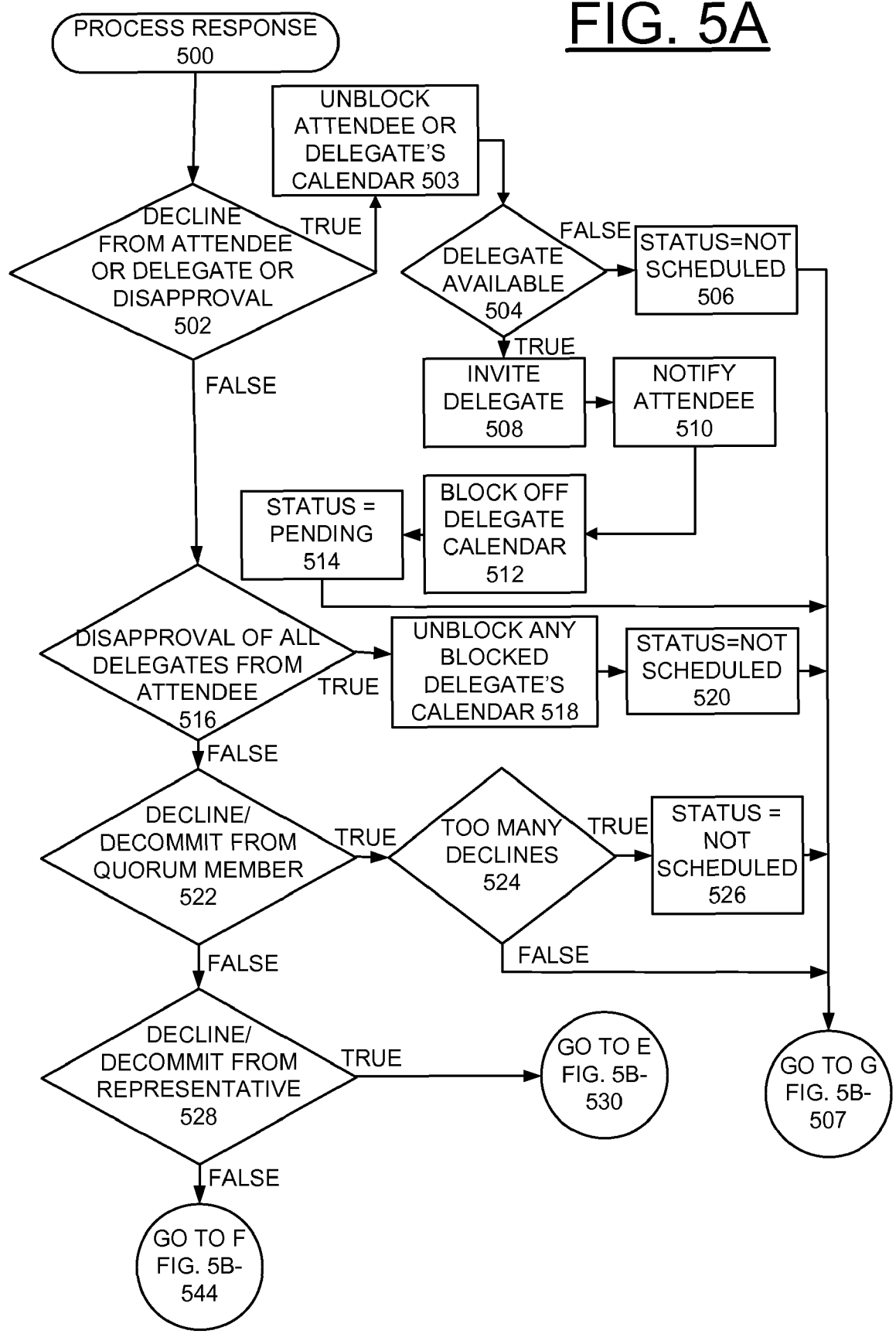
Figure 5B:
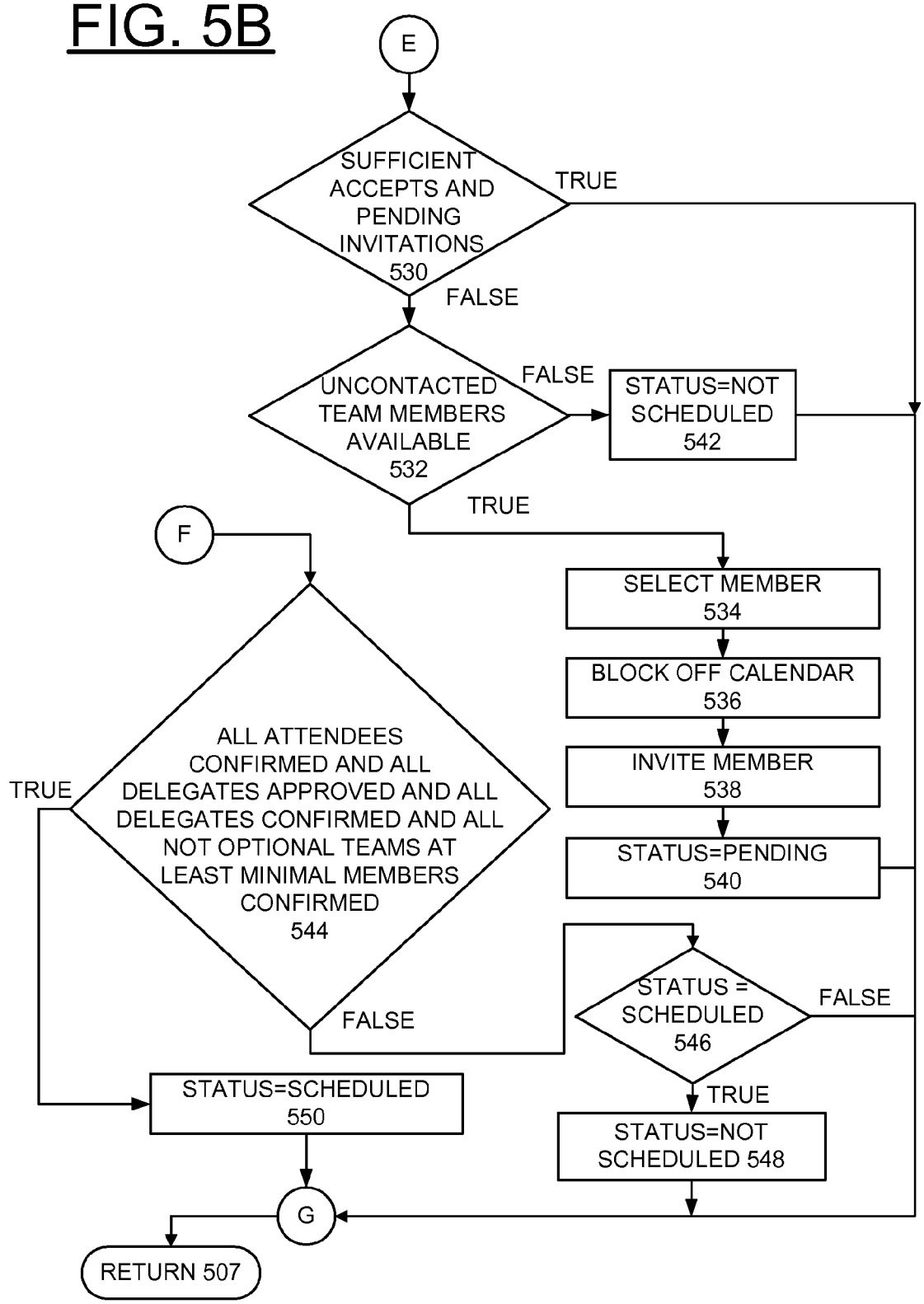

Referring now to FIGS. 5A and 5B, there are shown exemplary steps for the process response routine starting at a block 500. Checking for a decline or decommit from required attendee, delegate, or attendee disapproval of a selected delegate is performed as indicated in a decision block 502. If true, then the calendar of the declining or decommiting attendee or delegate is unblocked as indicated in a block 503, then checking for an available delegate that has not already been tried is performed as indicated in a decision block 504. The delegate list as shown in FIG. 11 is searched for the next untried delegate which matches the topic and the authority required by the meeting settings. When a delegate is not available, the status is set to not scheduled as indicated in a block 506. Then the sequential operations return as indicated in a block 507 following entry G in FIG. 5B. When a delegate is available, the delegate is invited as indicated in a block 508 and the attendee is notified as indicated in a block 510. Then the delegate's calendar is blocked off as indicated in a block 512. Status is set to pending as indicated in a block 514. Then the sequential operations return as indicated at block 507 following entry G in FIG. 5B. Otherwise when some response other than a decline or decommit from required attendee or the response is not an attendee's delegate or disapproval of a selected delegate is received, that is the response type of some other approval or decline/decommit, checking for a disapproval of all delegates from attendee is performed as indicated in a decision block 516. When a disapproval of all delegates from attendee is identified, any blocked delegate calendar are unblocked as indicated in a block 518, then the status is set to not scheduled as indicated in a block 520. Then the sequential operations return as indicated at block 507 following entry G in FIG. 5B. Otherwise when a disapproval of a delegate from attendee is not identified, checking for a decline or decommit from a quorum member is performed as indicated in a decision block 522. When a decline or decommit from a quorum member is identified, checking for too many declines is performed as indicated in a decision block 524. If true or too many declines are identified indicating a quorum of attendees is no longer committed, then the status is set to not scheduled as indicated in a block 526. When false or too many declines are not identified, the sequential operations return as indicated at block 507 following entry G in FIG. 5B. When a decline or decommit from a quorum member is not identified at decision block 522, checking for a decline or decommit from a representative is performed as indicated in a decision block 528. When true or a decline or decommit from a representative is identified, then the sequential operations continue following entry E in FIG. 5B at a block 530. When false or a decline or decommit from a representative is not identified, then the sequential operations continue following entry F in FIG. 5B at a block 544.

Referring now to FIG. 5B following entry E, checking for sufficient total of accepts and pending invitations is performed as indicated in a decision block 530. If true or the total number of accepts and pending invitations is enough for the meeting's minimal number, then processing continues to entry G in FIG. 5B. If false or insufficient total of accepts and pending invitations are identified, checking for uncontacted team members available is performed as indicated in a decision block 532. Decision block 532 is reached only after a decline or decommit from a representative that puts the total of known accepts and unknown accepts, those still pending, below the minimum required for the meeting. If true or uncontacted team members are available, a member is selected as indicated in a block 534. The member's calendar is blocked off as indicated in a block 536 and the member is invited as indicated in a block 538. The status is set to pending as indicated in a block 540. Then the sequential operations return as indicated at block 507 following entry G. Otherwise if false or uncontacted team members are not available, then the status is set to not scheduled as indicated in a block 542. In this case a decline or decommit has pushed those available below the number required, and no more uncontacted are available so the meeting must be not scheduled. Then the sequential operations return at block 507 following entry G.

Referring now to FIG. 5B following entry F, after a decline or decommit from a representative is identified at decision block 528 in FIG. 5A, checking whether all attendees confirmed and all delegates approved and all delegates confirmed and all not optional teams have at least minimal members confirmed is performed as indicated in a decision block 544. If false, then checking whether status equals scheduled is performed as indicated in a decision block 546. When the status is not equal scheduled, then the sequential operations return at block 507 following entry G. When the status equals scheduled, then status is set to not scheduled as indicated in a block 548 and then the sequential operations return at block 507. In other words, if the status was scheduled, it must now be not scheduled at block 548 because of the failure in decision block 544; otherwise the status may remain in the current status. Otherwise when true that all attendees confirmed and all delegates approved and all delegates confirmed and all not optional teams having at least minimal members confirmed, then status is set to scheduled as indicated in a block 550. This check treats quorum number as the minimal number of members. Then the sequential operations return at block 507.

Figure 6:
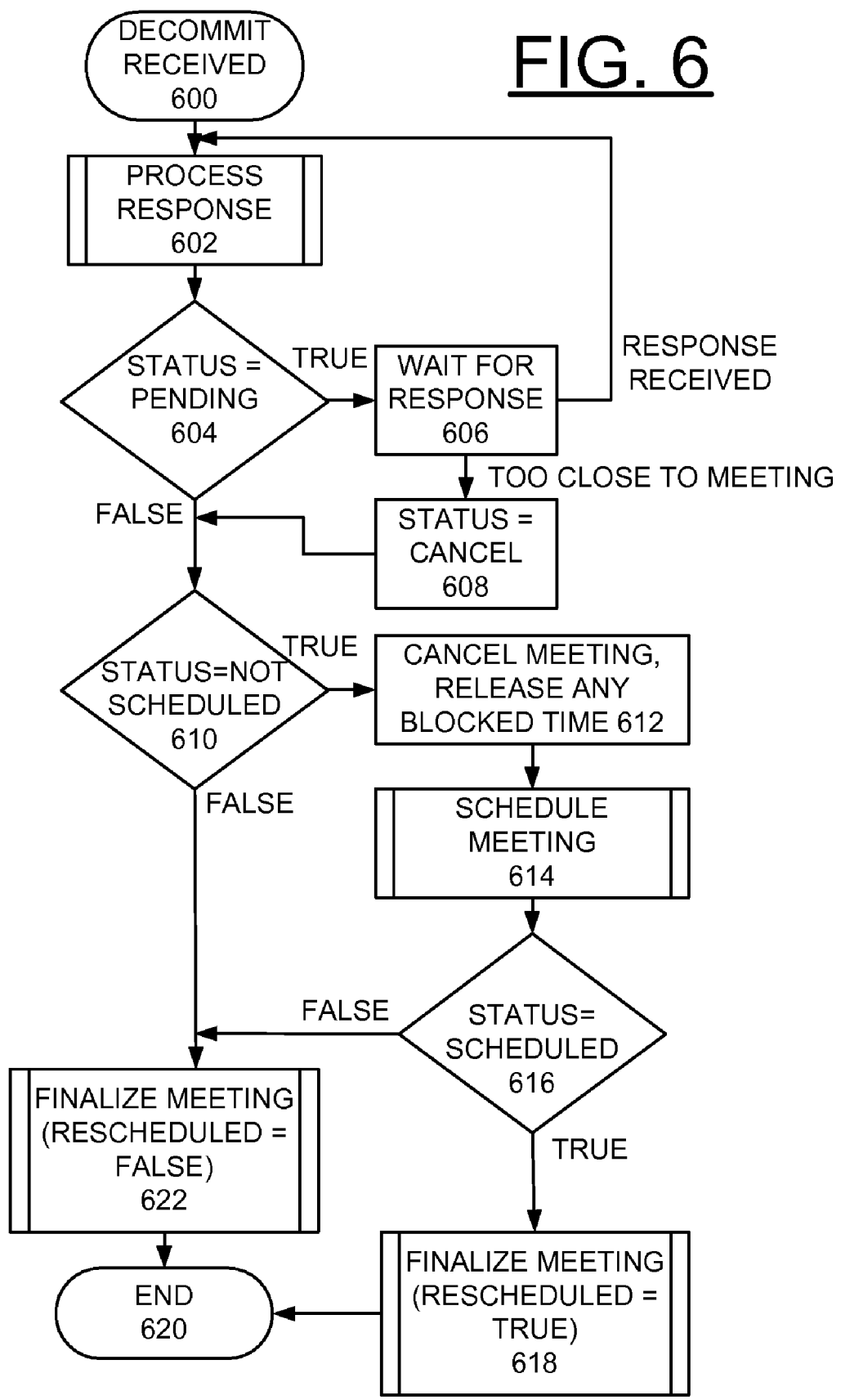

Referring now to FIG. 6, there are shown exemplary steps performed starting when a decommit is received after a meeting has already been scheduled as indicated in a block 600. Such a decommit would occur separately from the rest of the flow. The process response routine as illustrated and described with respect to FIGS. 5A and 5B is performed as indicated in a block 602. Then checking whether status equals pending is performed as indicated in a decision block 604. When true, then waiting for a response is provided as indicated in a block 606. When the response is received, flow returns to block 602 and the response is processed. If waiting becomes too close to the meeting time block, block 606 exits and status is set to cancel as indicated in a block 608. Then and when status does not equal pending, checking for status of not scheduled is performed as indicated in a decision block 610. If true or status equals not scheduled, then the meeting is canceled and any blocked time is released as indicated in a block 612. Then the schedule meeting routine as illustrated and described with respect to FIG. 2 is performed as indicated in a block 614 in an attempt to reschedule the meeting. Checking whether status equals scheduled is performed as indicated in a decision block 616. When true, then a finalize meeting routine is performed and rescheduled is set equal to true as indicated in a block 618. Then the sequential operations end as indicated in a block 620. The finalize meeting routine is illustrated and described with respect to FIG. 7. Otherwise when false or status equals scheduled at decision block 610, then the finalize meeting routine is performed and rescheduled is set equal to false as indicated in a block 622. Then the sequential operations end at block 620.

Figure 7:
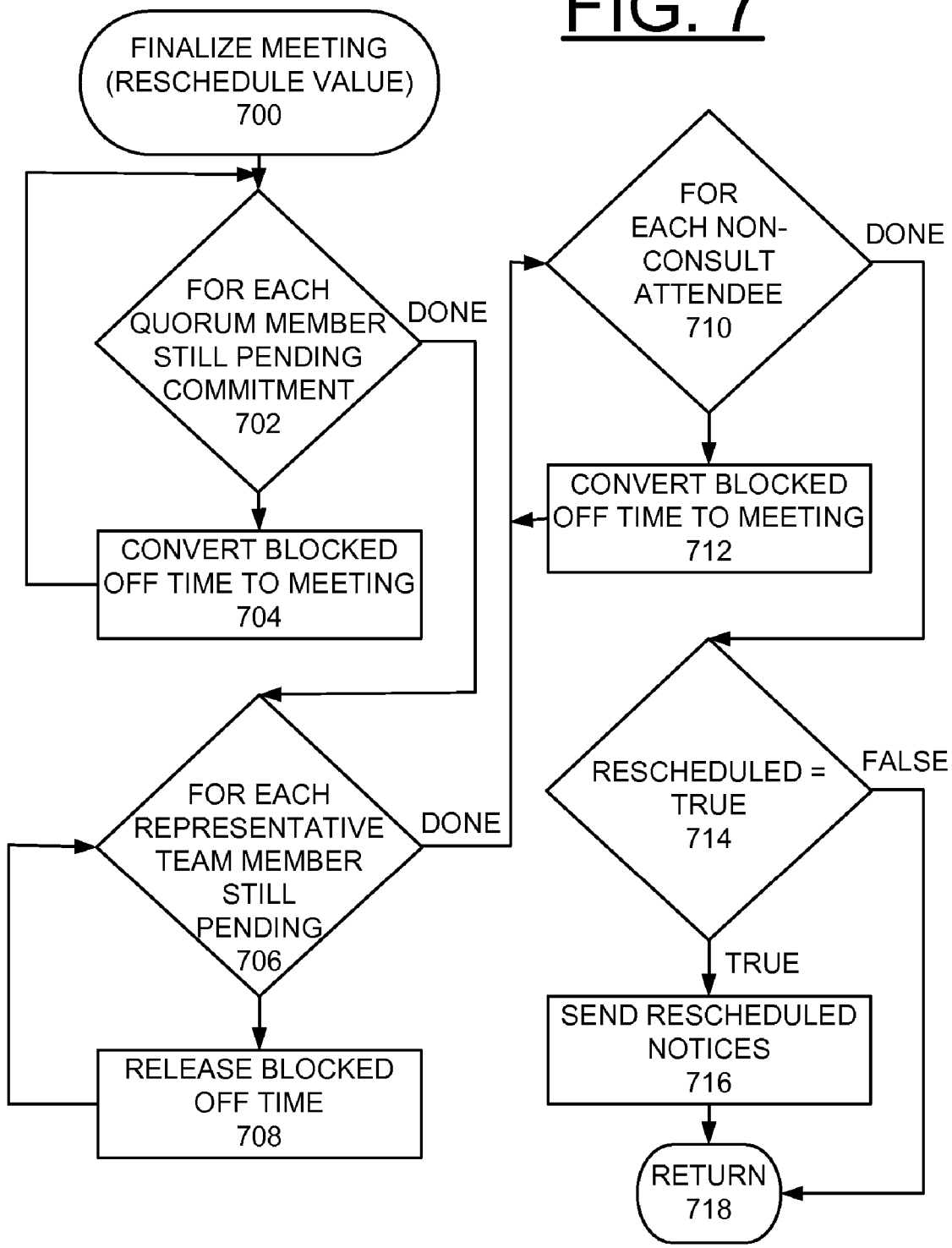

Referring now to FIG. 7, there are shown exemplary steps for the finalize meeting routine starting at a block 700. For each quorum member still pending commitment as indicated in a decision block 702 blocked off time is converted to meeting as indicated in a block 704. Then for each representative team member still pending as indicated in a decision block 706 blocked off time is released as indicated in a block 708. Next for each non-consult attendee as indicated in a decision block 710 blocked off time is converted to meeting as indicated in a block 712. Blocked off time is left as blocked time for consulters. Then checking for rescheduled is set to true is performed as indicated in a decision block 714. If rescheduled is set to true, then rescheduled notices are sent as indicated in a block 716. Then the sequential operations return as indicated in a block 718.

FIG. 8 illustrates an exemplary menu user entry screen for receiving user selected meeting settings for implementing the automated meeting scheduling methods using delegates, representatives, quorums, and teams generally designated by the reference character 800 of the preferred embodiment. User selected meeting settings 800 include a meeting title and a meeting topic. User selected meeting settings 800 include a time needed value; an earliest date and a latest date for the meeting; and multiple options including avoid lunch, avoid early, and avoid late. User selected meeting settings 800 include meeting invitees' data including name, attendance, delegate allowed, minimum representatives, maximize representatives, consult, and authority and options to add and remove invitees and to wait for response from invited persons to finalize the meeting. The meeting invitees' data is modified using invitee settings dialog from FIG. 9. User selected meeting settings 800 are provided for each meeting and can be saved as a profile or modified and reused.

FIG. 9 illustrates an exemplary menu user entry screen for receiving user selected invitee settings for implementing the automated meeting scheduling methods using delegates, representatives, quorums, and teams generally designated by the reference character 900 of the preferred embodiment. The selected invitee settings represent the request of the meeting owner for specific attendees or teams. User selected invitee dialog 900 includes multiple options for name or team; multiple options for attendance including required, optional, representative, and quorum; delegate allowed, minimum representatives, maximize representatives, consult, standby, and reachable. Consult standby indicates that the person must block off time and be physically available. Consult reachable indicates that the person be available by phone or pager. When an invitee is invited for consult standby, they are scheduled for the meeting time but are not expected to be at the meeting, just physically available, for example, in their office. When consult reachable is specified the invitee must be available by phone or pager, but not present or even have their calendar free, however any meeting on the calendar must allow them to take a consulting question. This is specified by the attendee on their setting of the primary meeting as specified from FIG. 10. User selected invitee dialog 900 includes multiple options for authority required including none, recommendation, and decision.

FIG. 10 illustrates an exemplary menu user entry screen for receiving user selected attendee properties for implementing the automated meeting scheduling methods using delegates, representatives, quorums, and teams generally designated by the reference character 1000 of the preferred embodiment. The selected attendee properties represent each attendee's assignment for the meeting and the attendees commitment to the meeting as well as the attendees willingness to allow interruptions for consulting. User selected attendee properties 1000 include attendance options including required and optional. This is set for the attendee, and the attendee does not change it. User selected attendee properties 1000 include multiple participation options including individual, quorum member with members committed, members committed list, and members required for quorum. The members committed value shows how many of the other quorum members have confirmed that they are attending. User selected attendee properties 1000 include further participation options including team representative with team members available, team members list, and the number of representative required. User selected attendee properties 1000 also include participation options of delegate for a specified attendee and consult options of standby and reachable. The attendees' assignment for participation is one of four types of participation: individual, quorum member, team representative or delegate. These types of participation are mutually exclusive in the preferred embodiment, and the attendee cannot change them. User selected attendee properties 1000 include commitment options including cannot attend and will attend with an option to check for decommit. The check for decommit button starts a process that runs FIG. 6 in a temporary mode, allowing the attendee to see if the decommit would cause the meeting to be adversely affected or whether potential delegates are available at the already scheduled times. This process may be understood having reference to FIGS. 5A, 5B, and 6. User selected attendee properties 1000 include consultation allowed options for standby and reachable including a selected low to high value and not acceptable. A low setting indicates low acceptability while a high setting indicates that the attendee does not mind being interrupted for consulting questions. The scale rating of the consultation allowed is translated to a modifier, which is between zero and one in the preferred embodiment and multiplied by the per minute constant for overlapping meetings as calculated in block 366 of FIG. 3C.

FIG. 11 illustrates an exemplary menu user entry screen for receiving user selected delegate profiles for implementing the automated meeting scheduling methods using delegates, representatives, quorums, and teams generally designated by the reference character 1100 of the preferred embodiment. User selected delegate profiles 1100 include topic, person, approval, authorization, consult me, and a premium values with options to move up and down and to add and delete. The order of the delegates in the list determines which one is selected. The first delegate profile that matches the needs of the meeting is used first. The delegate profiles list is kept by a user of the system as part of their general preference setting. Data is input and modified for the delegate profiles list using a delegate properties dialog shown in FIG. 12.

FIG. 12 illustrates an exemplary menu user entry screen for receiving user selected delegate properties for implementing the automated meeting scheduling methods using delegates, representatives, quorums, and teams generally designated by the reference character 1200 of the preferred embodiment. The delegate properties are set by potential attendees as part of their profile to allow the scheduler to automate selection of delegates. User selected delegate properties 1200 include multiple options for topic, new topic, any topic, person's name, and approval of automatic or explicit indicating the potential attendee may automatically send this delegate or explicit approval is needed. If explicit, the scheduler waits for approval as shown in block 434 of FIG. 4. Otherwise only notification is sent to the attendee. User selected delegate properties 1200 include authorization of make decisions, make recommendations, listen and report, and consult me. The authorizations for specified delegate of make decisions, make recommendations, and listen and report are mutually exclusive in the preferred embodiment, and correspond in purpose to the requested invitee settings of authority shown in FIG. 9 of decision, recommendation and none, respectively. An attendees setting for a delegate can include the stipulation that they must be consulted on decisions or recommendations. Whether the delegate actually consults the non-attendee is a matter between the delegate and the non-attendee.

But the scheduler assures the non-attendee can be contacted for consultation during that time. Thus, the meeting owner gets an individual at the meeting who can provide a decision, even though that may practically require a quick approval to the non-attendee. When consult me is selected, the schedule me for consult is automatically checked and defaults to reachable. User selected delegate properties 1200 also include multiple options for consultation including schedule me for consult, standby, and reachable; and for an additional cost associated with this delegate, expressed as a value percentage as used in block 332 in FIG. 3A. However the potential attendee may choose to be available for consultation even though the delegate is not required to come for consultation. The potential attendee may just desire to not be unavailable when the delegate is representing him.

Figure 13:
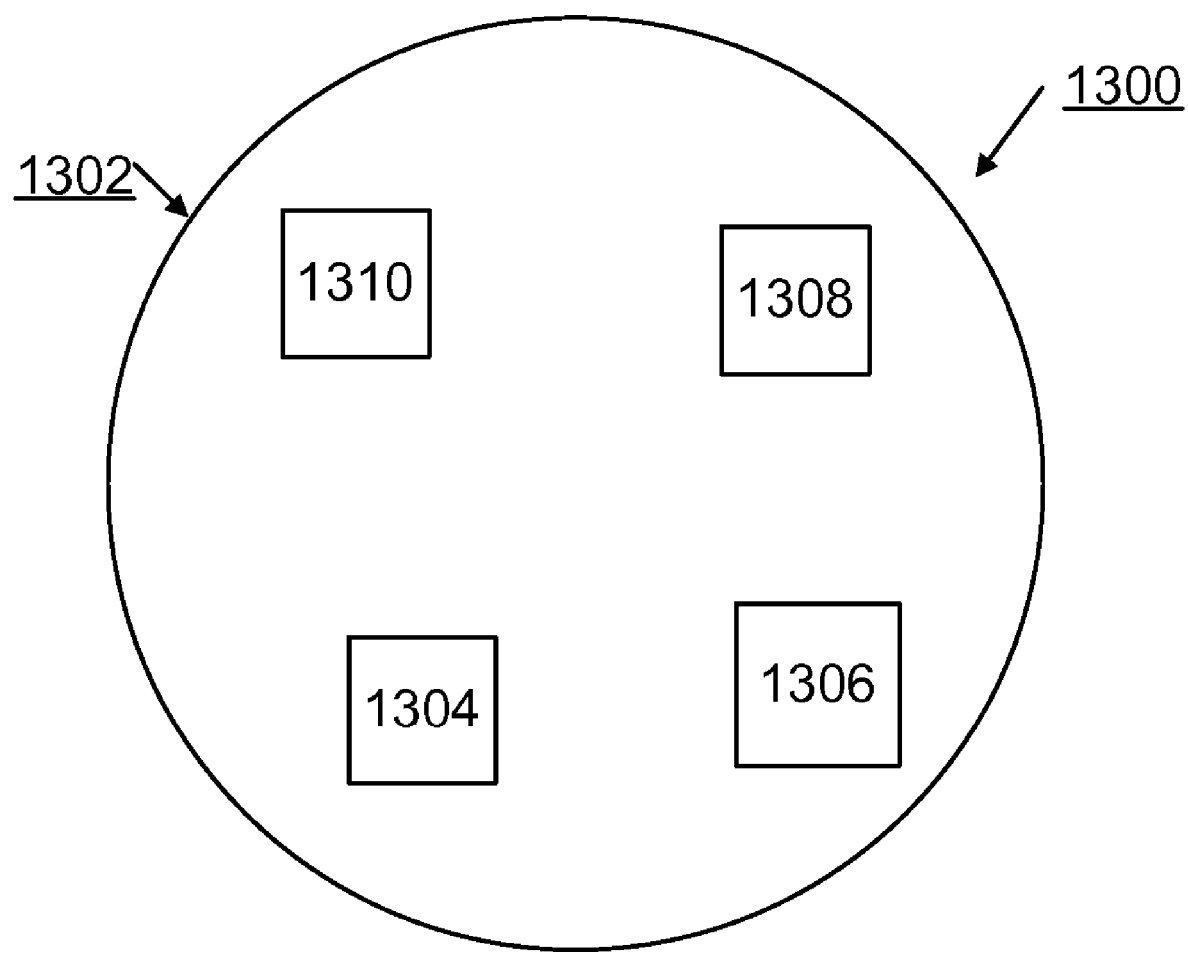
FIG. 13 is a block diagram illustrating a computer program product in accordance with the preferred embodiment.

Referring now to FIG. 13, an article of manufacture or a computer program product 1300 of the invention is illustrated. The computer program product 1300 includes a recording medium 1302, such as, a floppy disk, a high capacity read only memory in the form of an optically read compact disk or CD-ROM, a tape, a transmission type media such as a digital or analog communications link, or a similar computer program product. Recording medium 1302 stores program means 1304, 1306, 1308, 1310 on the medium 1302 for carrying out the automated meeting scheduling methods using delegates, representatives, quorums, and teams of the preferred embodiment of the preferred embodiment in the system 100 of FIGS. 1A and 1B.

A sequence of program instructions or a logical assembly of one or more interrelated modules defined by the recorded program means 1304, 1306, 1308, 1310, direct the computer system 100 for carrying out the automated meeting scheduling methods using delegates, representatives, quorums, and teams of the preferred embodiment of the preferred embodiment.

It should be understood that while the present invention has been described with better scores being higher scores, the present invention is not limited to higher scores being better. It should be understood that the present invention easily can be implemented with better scores being lower scores.

While the present invention has been described with reference to the details of the embodiments of the invention shown in the drawing, these details are not intended to limit the scope of the invention as claimed in the appended claims.

What is claimed is:

1. A method for automated meeting scheduling using delegates, representatives, quorums, and teams performed by an electronic calendar meeting scheduling program, said method comprising the steps of:
    storing meeting settings and invitees data for a meeting for each of the delegates, representatives, quorums, and teams; said meeting settings and invitees data including an invitee attendance type, delegates, representatives, quorums, and teams data;
    said electronic calendar meeting scheduling program calculating a selection score for a plurality of potential time blocks for the automated meeting scheduling utilizing said stored invitee attendance type, delegates, representatives, quorums, and teams data;
    said electronic calendar meeting scheduling program identifying unusable time blocks utilizing said calculated selection scores including each potential time block having less than a quorum of available quorum members and discarding said identified unusable time blocks to provide potential time blocks for automated meeting scheduling;
    said electronic calendar meeting scheduling program sorting by said potential time blocks for automated meeting scheduling by said calculated selection scores to identify a solution time block for automated meeting scheduling including at least a subset of a plurality of selected invitees; and
    said electronic calendar meeting scheduling program storing said identified solution time block for the automated meeting scheduling.

2. A meeting scheduler for automated meeting scheduling using delegates, representatives, quorums, and teams comprising:
    an electronic calendar meeting scheduling program being tangibly embodied on non-transitory computer readable medium;
    said electronic calendar meeting scheduling program storing meeting settings and invitees data for each of the delegates, representatives, quorums, and teams for a meeting; said meeting settings and invitees data including an invitee attendance type, delegates, representatives, quorums, and teams data;
    said electronic calendar meeting scheduling program calculating a selection score for a plurality of potential time blocks for the automated meeting scheduling and utilizing said stored invitee attendance type, delegates, representatives, quorums, and teams data;
    said electronic calendar meeting scheduling program identifying unusable time blocks utilizing said calculated selection scores including each potential time block having less than a quorum of available quorum members and discarding said identified unusable time blocks to provide potential time blocks for automated meeting scheduling;
    said electronic calendar meeting scheduling program sorting by said plurality of said potential time blocks for automated meeting scheduling by said calculated selection scores to identify a solution time block for automated meeting scheduling including at least a subset of a plurality of selected invitees; and
    said electronic calendar meeting scheduling program storing said identified solution time block for the automated meeting scheduling.

\* \* \* \* \*